United States Patent [19]

Bannai et al.

[11] Patent Number: 5,637,005

[45] Date of Patent: Jun. 10, 1997

[54] CLOCK SPRING CONNECTOR

[75] Inventors: Hiroyuki Bannai, Furukawa; Hironori Kato, Sendai; Kunihiko Sasaki, Miyagi-ken, all of Japan

[73] Assignee: Alps Electric Co., Ltd., Tokyo, Japan

[21] Appl. No.: 250,962

[22] Filed: May 31, 1994

[30] Foreign Application Priority Data

May 31, 1993 [JP] Japan ................. 5-129341
Jun. 28, 1993 [JP] Japan ................. 5-157484

[51] Int. Cl.⁶ ................................................ H01R 3/00
[52] U.S. Cl. ................................. 439/164; 439/15
[58] Field of Search ............................ 439/5, 13, 15, 439/17, 22, 27, 164, 492

[56] References Cited

U.S. PATENT DOCUMENTS

| | | | |
|---|---|---|---|
| 3,763,455 | 10/1973 | Confer et al. | 439/15 |
| 4,540,223 | 9/1985 | Schmerda et al. | 439/15 |
| 4,927,364 | 5/1990 | Inui et al. | 439/27 |
| 5,046,951 | 9/1991 | Suzuki | 439/164 |
| 5,102,061 | 4/1992 | Suzuki et al. | 439/15 |
| 5,224,871 | 7/1993 | Ida et al. | 439/15 |
| 5,226,831 | 7/1993 | Horiuchi | 439/15 |
| 5,252,085 | 10/1993 | Kato et al. | 439/164 |
| 5,259,775 | 11/1993 | Kubota et al. | 439/164 |
| 5,314,344 | 5/1994 | Ida et al. | 439/164 |

FOREIGN PATENT DOCUMENTS

| | | | |
|---|---|---|---|
| 2164506 | 3/1986 | United Kingdom | 439/13 |
| 2233169 | 2/1991 | United Kingdom | 439/15 |

*Primary Examiner*—Neil Abrams
*Assistant Examiner*—Brian J. Biggi
*Attorney, Agent, or Firm*—Guy W. Shoup; Patrick T. Bever

[57] ABSTRACT

A clock spring connector including a movable housing rotatably connected to a fixed housing, the movable housing and fixed housings defining an annular cable accommodating area therebetween. A spacer is movably housed in the cable accommodating area. A ribbon cable is housed in the cable accommodating area and includes a first portion wound in a first direction on the fixed housing, a turned-back (U-shaped) portion extending through an opening in the spacer, and a second portion wound in a second direction on the movable housing. The spacer includes a plurality of rollers and raised portions located in gaps formed between each of the rollers, except for the opening through which the turned-back portion is passed, thereby preventing the erroneous threading of the cable when the clock spring connector is assembled. Elastic arms are positioned between the spacer and surfaces of the annular cable accommodating area to elastically bias the spacer away from these surfaces, thereby preventing noise caused by contact between the spacer and the surfaces.

7 Claims, 13 Drawing Sheets

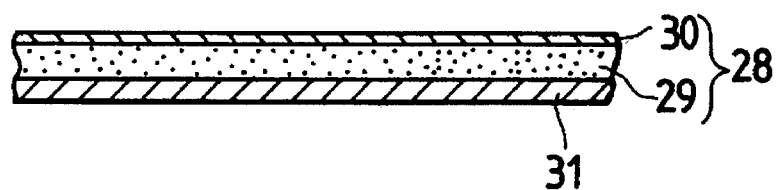
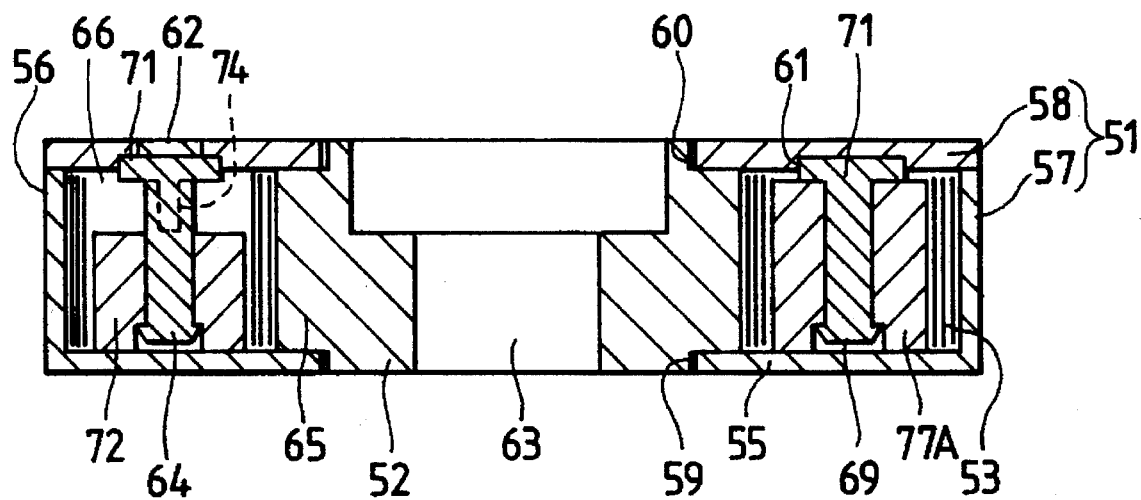

CLOCK SPRING CONNECTOR

BACKGROUND OF THE INVENTION

1. Field of the Invention

The present invention relates to a clock spring connector for use as an electric connection means in an air bag system included in a steering unit of an automobile.

2. Description of the Prior Art

A clock spring connector comprises a fixed member, a movable member attached rotatively around the fixed member, and a band-like flexible cable establishing the connection between the fixed member and the movable member. The clock spring connector has been widely used to serve as an electric connection means between a movable member and a fixed member that has a finite number of rotations, such as a steering unit of an automobile.

Since a clock spring connector of the foregoing type has the flexible cable, the cost of which being a very large portion of the overall cost of the clock spring connector, clock spring connectors each have been arranged to reduce the cost by shortening the flexible cable as disclosed in U.S. Pat. Nos. 4,540,223, 5,102,061 and so forth.

FIG. 23 is a plan view showing the schematic structure of the clock spring connector disclosed as described above. The clock spring connector shown in FIG. 23 comprises a movable member 101 rotatively disposed at the center of a cylindrical fixed member 100. The fixed member 100 and movable member 101 form an annular space 107 which accommodates a band-like flexible cable 102. The two ends of the flexible cable 102 are, while being respectively fixed to the fixed member 100 and the movable member 101, past to the outside of the annular space 107. The winding direction around the outer cylinder of the fixed member 100 and that around the inner cylinder of the movable member 101 are reversed in the annular space 107 at a position of a U-shape reversal portion 102a. In addition, an annular rotary plate 103 is disposed in the annular space 107 which has a planetary gear (omitted from illustration) pivotally supported to engage to gears respectively formed on the outer surface of the fixed member 100 and that of the movable member 101. On the other hand, the rotary plate 103 has, on the upper surface thereof, a plurality protruding shafts 104 located at predetermined intervals in the circumferential direction of the rotary plate 103. Each shaft 104 has a roller 105 freely rotatively attached thereto, and the reversal portion 102a is looped around one of the rollers 105.

When the movable member 101 of the thus constituted clock spring connector is rotated clockwise when viewed in FIG. 23, the reversal portion 102a is moved clockwise in the annular space 107 by a quantity of rotation which is smaller than that of the movable member 101. Thus, the flexible cable 102 is brought to a rewinding state in which a portion wound around the inner cylinder portion of the fixed member 100 become larger. Since the planetary gear (omitted from illustration) is, at this time, rotated and revolved in the annular space 107 due to the rotation of the movable member 101, a spacer 106 is moved clockwise at the same speed as that of the reversal portion 102a. As a result, the flexible cable 102 is smoothly moved in the annular space 107 without being pulled by the roller 105. The spacer 106 is a member including the rotary plate 103, shaft 104 and the roller 105. On the contrary, when the movable member 101 is rotated counterclockwise when viewed in FIG. 23, the reversal portion 102a is moved in the same direction by a quantity of rotation which is smaller than that of the movable member 101. As a result, the flexible cable 102 is brought to a wound state in which it is wound around the inner cylinder of the movable member 101 by a larger quantity. Also in this case, the spacer 106 is moved in the same direction at the same speed as that of the reversal portion 102a. As a result, the flexible cable 102 is smoothly moved in the annular space 107 without being pulled by the roller 105.

If the spacer 106 is moved by the flexible cable 102 because no planetary gear is provided, predetermined clearances have been required from a housing of the accommodating space 107, such as the ceiling surface and the bottom surface, to which the spacer 106 faces.

An automobile having the clock spring connector is easily affected the surface condition of a road or the like during running, and therefore vibrations of the automobile, of course, act on the clock spring connector. However, the conventional clock spring connector structured as described above and comprising the spacer 106 rotatively disposed in the accommodating space 107 has necessitates the forming of clearances between the spacer 106 and the ceiling surface of the accommodating space 107 in order for the spacer 106 to rotate smoothly. Therefore, if the axial vibrations of the steering shaft act on the clock spring connector, the spacer 106 is vertically vibrated in the clearance and thus it comes in conflict with both of the ceiling surface and the bottom surface of the accommodating space 107. Thus, there arises a problem of noise. Since the spacer 106 is typically made of hard plastic material, variations in the dimensional accuracy of each member and variations caused by temperature change or the like causes the clearance to easily be dispersed. Since a sufficient clearance has been given to cope with the dispersion, the problem of noise become critical.

SUMMARY OF THE INVENTION

Accordingly, the present invention is directed to overcome the problems experienced with the conventional technology, and therefore an object of the invention is to provide a clock spring connector capable of preventing generation of noise while maintaining rotations of a spacer.

Since the conventional clock spring connector has the arrangement that the direction of winding the flexible cable is reversed between the inner cylinder portion and the outer cylinder portion, the required length of the flexible cable can significantly be shortened as compared with a clock spring connector having the flexible cable (spirally) wound around the inner cylinder portion and the outer cylinder portion in the same direction. Therefore, the cost can be reduced. Since the plurality of rollers are disposed between the portion in which the flexible cable is wound around the inner cylinder portion and the portion in which the same is wound around the outer cylinder portion, the flexible cable can be controlled in the radial direction on the overall circumference of the annular space. Therefore, a winding operation or rewinding operation can be performed smoothly.

However, the arrangement that each roller is pivotally supported on the same plane of the rotary plate and the U-shape reversal portion of the flexible cable can be looped around any roller in the assembling process creates a problem in that the rotary plate can be mounted at an erroneous angle with respect to the reversal portion and thus a rate of generation of defects cannot be reduced. For example, the clock spring connector must be mounted on a steering unit in such a way that the movable member is able to rotated clockwise and counterclockwise by the same angular degrees with respect to the center position of the steering wheel. Therefore, the movable member must be aligned to the neutral position with respect to the fixed member. As an alignment mechanism of the foregoing type, a method has been suggested which has an arrangement that an aligning indicator is disposed on the rotary plate and the alignment is performed, with the indicator observed from outside. In this case, if the U-shape reversal portion is looped around a roller other than the specified roller, the clock spring connector is undesirably formed in a state where the alignment indicator and the U-shape reversal portion are displaced from each other. Thus, the movable member cannot be disposed correctly. A foregoing-type erroneous assembly of the rotary plate takes place in a case where the U-shape reversal portion must be looped around a specific roller as well as the case where the aligning indicator is disposed on the rotary plate.

The present invention is directed to overcome the foregoing problem, and an object of the invention is to provide a clock spring connector which, whether or not a roller group pivotally supported by a rotary plate has been disposed at correct positions with respect to a U-shape reversal portion of a flexible cable, can easily be discriminated and which therefore exhibits excellent assembling workability.

The foregoing object of the present invention can be achieved by a clock spring connector comprising: a first housing having an inner cylinder portion; a second housing having an outer cylinder portion and mounted rotatively with respect to the first housing through an annular accommodating space; a spacer disposed in the accommodating space, and a flexible cable wound around the inner cylinder portion and the outer cylinder portion in opposite directions and having a reversal portion which is passed through the spacer, the spacer being arranged to move in the accommodating space to follow the reversal portion, wherein the spacer is provided with an elastic portion facing at least a ceiling surface or bottom surface of the accommodating space.

The foregoing object of the present invention can also be achieved by a clock spring connector comprising: a first housing having an inner cylinder portion; a second housing having an outer cylinder portion and mounted rotatively with respect to the first housing through an annular accommodating space; a spacer disposed in the accommodating space, and a flexible cable wound around the inner cylinder portion and the outer cylinder portion in opposite directions and having a reversal portion which is passed through the spacer, the spacer being arranged to move in the accommodating space to follow the reversal portion, wherein an elastic portion facing at least a ceiling surface or bottom surface of the accommodating space is formed.

The foregoing object of the present invention can also be achieved by a clock spring connector comprising: a first housing having an inner cylinder portion; a second housing having an outer cylinder portion and mounted rotatively with respect to the first housing through an annular accommodating space; a spacer disposed in the accommodating space, and a flexible cable wound around the inner cylinder portion and the outer cylinder portion in opposite directions and having a reversal portion which is passed through the spacer, the spacer being arranged to move in the accommodating space to follow the reversal portion, wherein the spacer is made of an elastic member.

The foregoing object of the present invention can also be achieved by a clock spring connector comprising: a first housing having an inner cylinder portion; a second housing having an outer cylinder portion and mounted rotatively with respect to the first housing through an annular accommodating space; a spacer disposed in the accommodating space, and a flexible cable wound around the inner cylinder portion and the outer cylinder portion in opposite directions and having a reversal portion which is passed through the spacer, the spacer being arranged to move in the accommodating space to follow the reversal portion, wherein the spacer has a plurality of first projections facing a ceiling surface of the accommodating space and a plurality of second projections facing a bottom surface of the accommodating space, the first projections and the second projections being deflected in the circumferential direction.

The foregoing object of the present invention can also be achieved by a clock spring connector comprising: a fixed member having a first cylinder portion; a movable member having a second cylinder portion and mounted rotatively with respect the fixed member; a band-like flexible cable accommodated in a space formed between the first cylinder portion and the second cylinder portion; an annular rotary plate disposed rotatively in the space; and a plurality of rollers pivotally supported by the rotary plate at predetermined intervals, the flexible cable being reversed along one of the rollers so as to be wound around the fixed member and the movable member in opposite directions, and two ends of the flexible cable being fixed by the fixed member and the movable member so as to be electrically ejected to outside, wherein ribs each having a width narrower than the diameter of the roller are formed on a locus on which each roller group of the rotary plate is disposed, the ribs being disposed except a portion in which a reversal portion of the flexible cable is located.

When the first or second housing is rotated forwards or reversely in synchronization with the rotations of the steering wheel, the U-shape reversal portion of the flexible cable is moved in the same direction by a quantity of rotation which is smaller than that of the steering wheel. Also the spacer is, in the circumferential direction, smoothly moved in the accommodating space. As a result, the flexible cable is brought to a wound state in which it is wound around the inner cylinder portion or a rewound state in which it is rewound around the outer cylinder portion. If vibrations act on the clock spring connector from outside during running of an automobile, in particular, if vibrations act on the same in the axial direction of the steering shaft, the spacer is vertically moved in the accommodating space. However, noise generated due to conflict of the spacer with the ceiling surface and the bottom surface of the accommodating space can be absorbed or eliminated due to the elastic portion disposed on the spacer or the housing or due to the elasticity of the spacer.

If the movable member is rotated forwards or reversely, the U-shape reversal portion of the flexible cable looped to a specific roller of the accommodating space is moved in the same direction by a quantity of rotation which is smaller than that of the movable member. Also the rotary plate receives the force from the reversal portion so as to follow the reversal portion. Thus, the flexible cable is brought to a rewound state where it is rewound around the first cylinder portion or a wound state where it is wound around the second cylinder portion. If the reversal portion of the flexible cable is looped to a roller except the specific roller of the rotary plate, the widthwise end of the flexible cable is brought into contact with the rib of the rotary plate. Therefore, the rotary plate cannot be disposed into a space between the first cylinder portion of the fixed member and the second cylinder portion of the movable member. As a result, whether or not the reversal portion has been correctly looped to the specific roller of the rotary plate can easily be discriminated.

Other and further objects, features and advantages of the invention will be appear more fully from the following description.

BRIEF DESCRIPTION OF THE DRAWINGS

FIG. 15 is an enlarged view showing an elastic sheet provided for the clock spring connector shown in FIG. 14;

FIG. 16 is a cross sectional view showing a clock spring connector according to a sixth embodiment of the present invention;

DESCRIPTION OF THE PREFERRED EMBODIMENTS

Preferred embodiments of the present invention will now be described with reference to the drawings.

Figure 1:
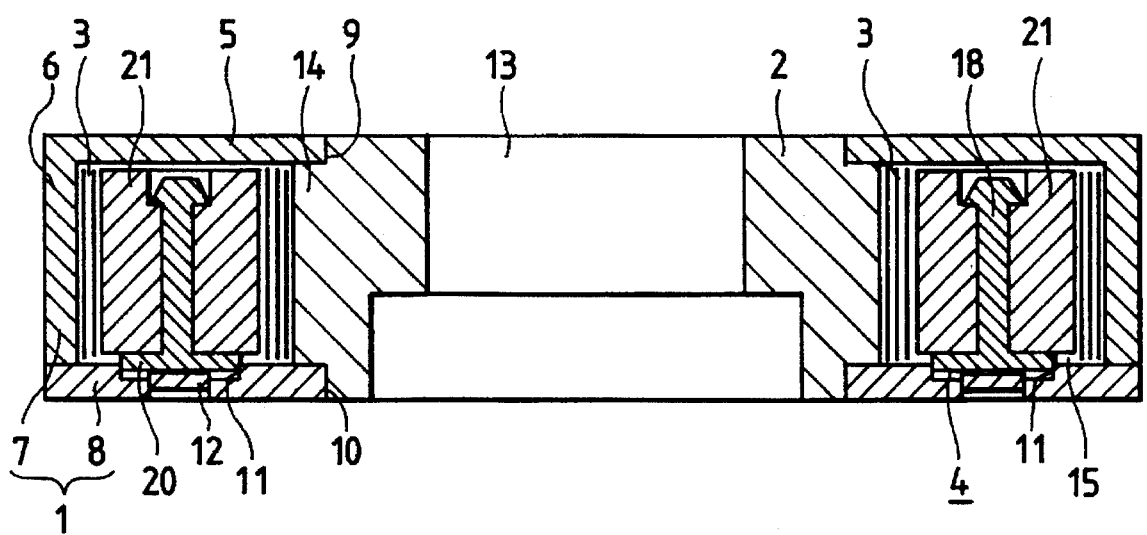
FIG. 1 is a vertical cross sectional view showing a clock spring connector according to a first embodiment of the present invention.
Figure 2:
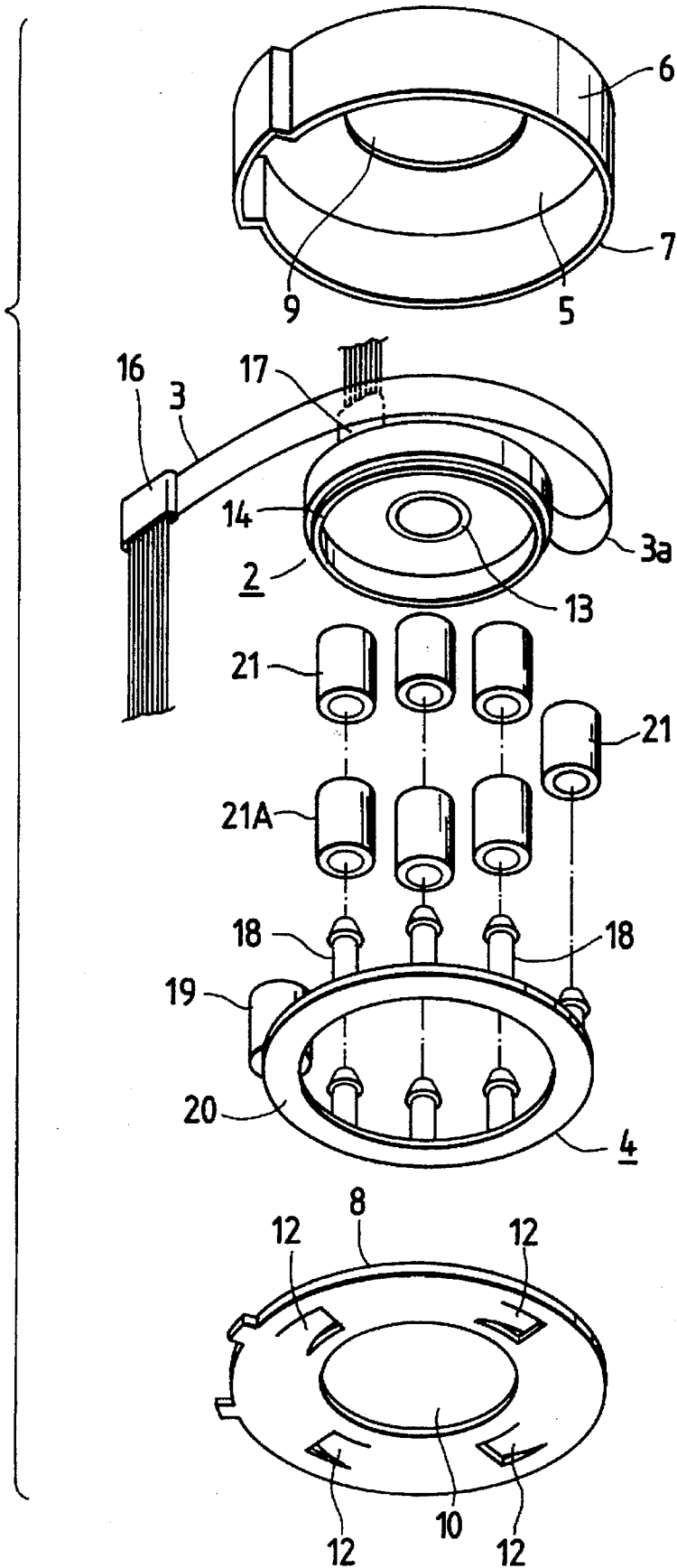
FIG. 2 is an exploded perspective view showing the clock spring connector according to the first embodiment.
Figure 3:
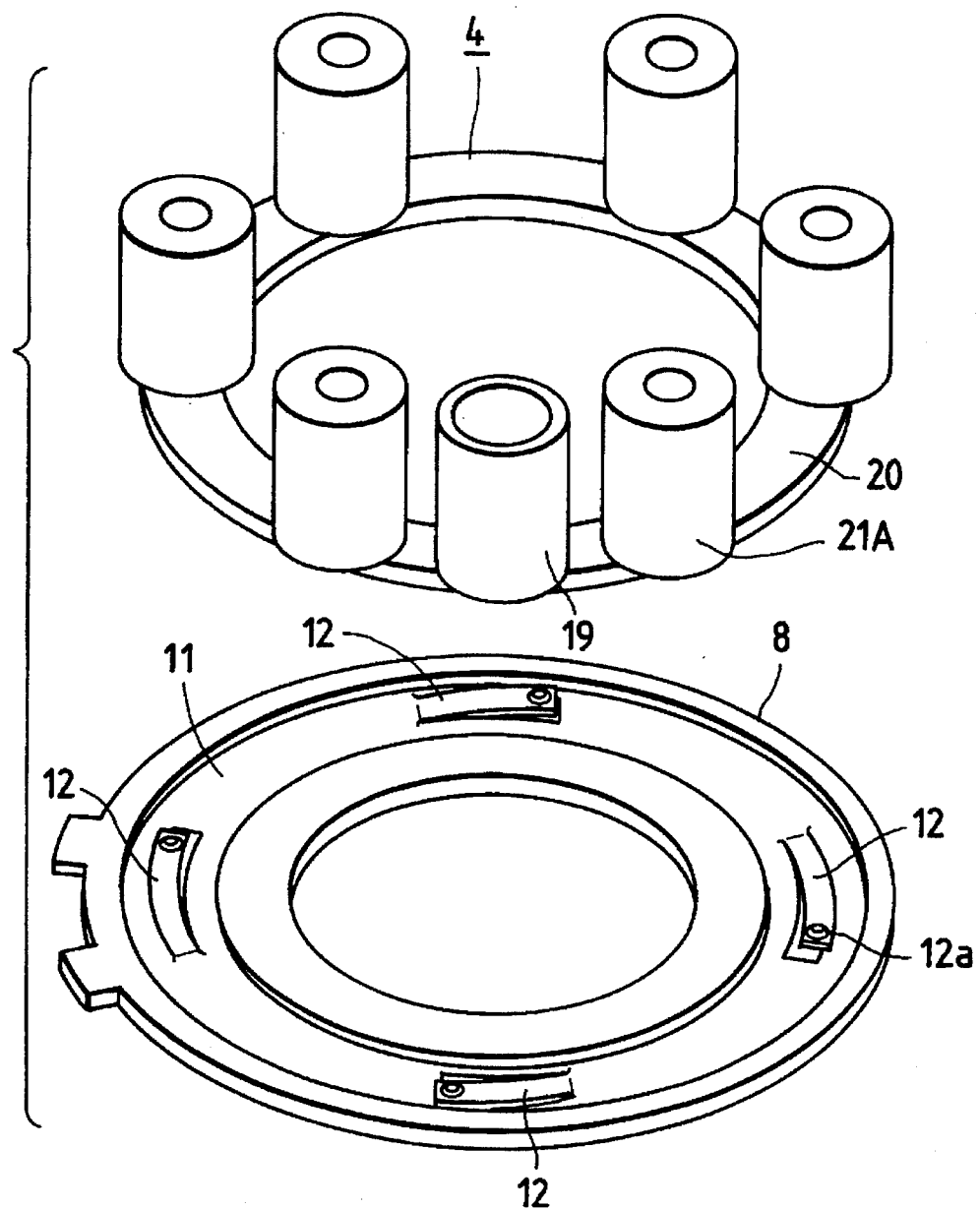
FIG. 3 is a perspective view of a spacer and a lower cover provided for the clock spring connector shown in FIG. 1 when viewed from an upper position.
Figure 4:
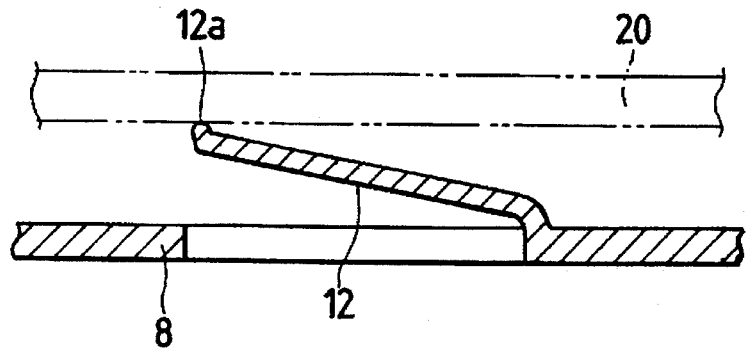
FIG. 4 is a cross sectional view showing an essential portion of the lower cover.

FIG. 1 is a vertical cross sectional view showing a clock spring connector according to a first embodiment of the present invention. FIG. 2 is an exploded perspective view showing the clock spring connector of FIG. 1. FIG. 3 is a perspective view showing a spacer and a lower cover provided for the clock spring connector of FIG. 1. FIG. 4 is a cross sectional view showing an essential portion of the lower cover. As shown in FIGS. 1 to 4, the clock spring connector according to this embodiment comprises a second housing 1, a first housing 2 disposed rotatively around the second housing 1, a flexible cable 3 accommodated between the two housings 1 and 2, and a spacer 4 rotatively disposed between the two housings 1 and 2.

The second housing 1 is composed of an upper case 7 having an outer cylinder portion 6 suspended along an outer surface of a ceiling plate 5 and a lower cover 8 integrally joined to the top end of the outer cylinder portion 6. The ceiling plate 5 and the lower cover 8 have, at their centers, center holes 9 and 10, respectively. Moreover, an annular guide groove 11 is formed in the top surface of the lower cover 8. The guide groove 11 has a plurality of cantilever-like elastic arms 12 formed integrally with the guide groove 11. In this embodiment, four elastic arms 12 are disposed at equal intervals of about 90 degrees in the circumferential direction of the guide groove 11. Each of the free ends of the elastic arms 12 diagonally extends in the upward direction while having a hemisphere projection 12a formed at the top surface thereof. On the other hand, the first housing 2 is formed into a cylindrical member having a shaft-insertion hole 13 at the central portion thereof. As a result, when the top and bottom end of the first housing 2 are guided by the center holes 9 and 10 of the corresponding upper case 7 and lower cover 8, the first housing 2 can be rotated with respect to the second housing 1. In addition, an annular accommodating space 15 is formed between the ceiling plate 5 adjacent to the second housing 1 and the outer cylinder portion 6 and between the lower cover 8 and the inner cylinder portion 14 forming the outer surface of the first housing 2. The components of the first and second housings 1 and 2 are made of hard plastic having excellent rigidity exemplified by polyacetal, polycarbonate or the like.

The flexible cable 3 comprises a band-like flat cable formed by laminating two parallel conductive wires with a pair of insulating films. In this embodiment, a flat cable for six circuits formed by embedding six conductive lines is used. An end of the flexible cable 3 is connected to a first connector 16 fixed to the outer cylinder portion 6 so as to be ejected to the outside of the second housing 1 through the first connector 16. On the other hand, another end of the flexible cable 3 is connected to a second connector 17 secured to the inner cylinder 14 so as to be ejected to the outside of the first housing 2 through the second connector 17. The flexible cable 3 is accommodated in the accommodating space 15 in such a way that it is clockwise wound from the first connector 16 to the inner wall of the outer cylinder portion 6 and is reversed in the form of a U-shape at a position (hereinafter called a "reversal portion 3a"), and it is counterclockwise wound around the outer wall of the inner cylinder portion 14 to reach the second connector 17.

The spacer 4 comprises a rotary plate 20 having, on the top surface thereof, a plurality of pins 18 and a fixed cylinder 19 stood erect, the spacer 4 further comprising a group of rollers 21 rotatively and pivotally supported by respective pins 18. The foregoing components are made of hard plastic, such as polypropylene. The spacer 4 is, in a state where its rotary plate 20 is positioned at a lower position, disposed in the accommodating space 15. When the rotary plate 20 is engaged to the guide groove 11, the spacer 4 is rotatively guided in the radial direction of the accommodating space 15. A clearance is formed between the lower surface of the rotary plate 20 and the top surface (the bottom surface of the guide groove 11) of the lower cover 8. The projections 12a of the respective elastic arms 12 are elastically in contact with the lower surface of the rotary plate 20. The reversal portion 3a of the flexible cable 3 is passed through a portion between the fixed cylinder 19 and a roller 21 (hereinafter called a "reversal roller" given reference numeral 21A) facing the fixed cylinder 19, the reversal portion 3a being then looped around the reversal roller 21A.

With reference to an example in which the second housing 1 is used as the fixed member and the first housing 2 is used as the movable member, the operation of the clock spring connector according to this embodiment will now be described. In the aforesaid case, the second housing 1 is fixed to a steering column portion of a steering unit and a lead wire passing through the upper case 7 is connected to an air bag drive circuit or a horn circuit or the like mounted on the car body portion. Further, the first housing 2 is connected to a steering shaft or a steering wheel, while the lead wire passing through the first housing 2 is connected to an inflater for an air bag or a horn switch or the like.

When the steering wheel is rotated clockwise or counterclockwise, the rotational force is transmitted to the first housing 2 and thus the first housing 2 is rotated clockwise or counterclockwise. If the first housing 2 is rotated counterclockwise from the neutral position of the steering wheel, the reversal portion 3a of the flexible cable 3 is moved counterclockwise by a quantity of rotation which is smaller than that of the first housing 2. As a result, the reversal portion 3a is moved apart from the reversal roller 21A of the spacer 4 to press the fixed cylinder 19. Also the spacer 4 is moved counterclockwise to follow the reversal portion 3a so that the flexible cable 3 is ejected from the inner cylinder portion 14 by a length which is about two times the quantity of movement and is rewound around the outer cylinder portion 6. Although the rotary plate 20 of the spacer 4 and each elastic arm 12 are in contact with each other in the guide groove 11 in the aforesaid case, the spacer 4 is able to move smoothly in the accommodating space 15 because they are in point-contact with each other in an elastic manner at the projection 12a. The movement of the flexible cable 3 protruding from the inner cylinder portion 14 to expand outwards in the radial direction is restricted by the fixed cylinder 19 and each group of rollers 21. Therefore, the flexible cable 3 can be ejected smoothly toward the reversal portion 3a and can assuredly be rewound around the outer cylinder portion 6 through the reversal portion 3a.

If the first housing 2 is, on the contrary to the above, rotated clockwise from the neutral position of the steering wheel, the reversal portion 3a of the flexible cable 3 is moved clockwise by a quantity of rotation which is smaller than that of the first housing 2 and thus the reversal roller 21A is pulled by the reversal portion 3a. Therefore, also the spacer 4 is moved clockwise to follow the reversal portion 3a. Thus, the flexible cable 3 is unwound from the outer cylinder portion 6 by a length which is about two times the quantity of the movement so as to be wound around the inner cylinder portion 14. Since the movement of the flexible cable 3 unwound from the outer cylinder portion 6 toward the inside portion in the radial direction is, in the aforesaid case, restricted by the fixed cylinder 19 and each group of rollers 21, the reversal portion 3a can be unwound smoothly and assuredly wound around the inner cylinder portion 14 through the reversal portion 3a.

With the first embodiment, the rollers 21 are lightly pressed against the ceiling plate 5 in a state where moderate vibrations are transmitted from the automobile. If intense vibrations are transmitted, particularly if intense vibrations in the axial direction of the steering shaft act on the clock spring connector, the vibrations cause the spacer 4 to move vertically in the accommodating space 15. However, the aforesaid movement is moderated because each elastic arm 12, which is in contact with the rotary plate 20 of the spacer 4, is deflected. Therefore, the rotary plate 20 of the spacer 4 does not come in contact with the top surface of the lower cover 8. Even if the fixed cylinder 19 and the group of rollers 21 come in contact with the lower surface of the ceiling plate 5, noise generation can be halved. Furthermore, the elastic contact established between the projection 12a of each elastic arm 12 and the top surface of the rotary plate 20 in the circumferential direction at the same intervals enables the spacer 4 to be elastically held with excellent balance and improves an effect of preventing noise generation. Even if the group of rollers 21 and the ceiling plate 5 are brought to a non-contact state due to dispersion in the dimension accuracy of the elements and temperature change, that is, if a clearance is undesirably formed between the group of rollers 21 and the ceiling plate 5, contact between the rotary plate 20 of the spacer 4 with the top surface of the lower cover 8 can be relaxed by each elastic arm 12. Thus, the effect of eliminating noise can be maintained. If an elastic member is disposed on the lower surface of the ceiling plate 5, the elastic member serves as a cushion and accordingly the noise can furthermore be eliminated.

Figure 5:
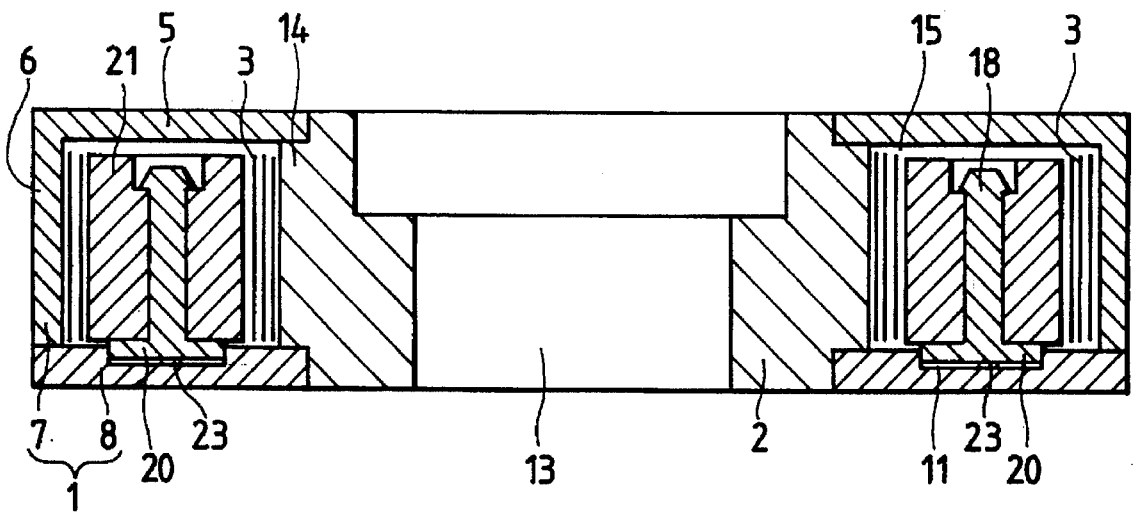
FIG. 5 is a vertical cross sectional view showing a clock spring connector according to a second embodiment of the present invention.
Figure 6:
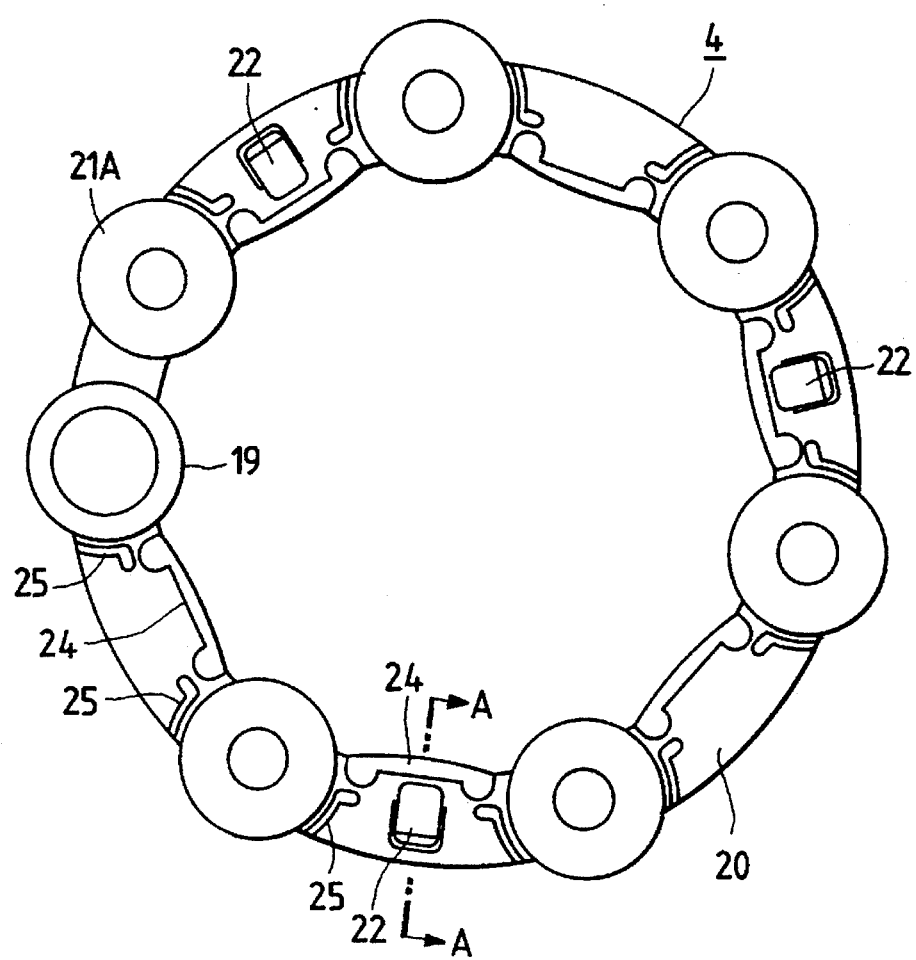
FIG. 6 is a plan view showing a spacer provided for the clock spring connector shown in FIG. 5.
Figure 7:
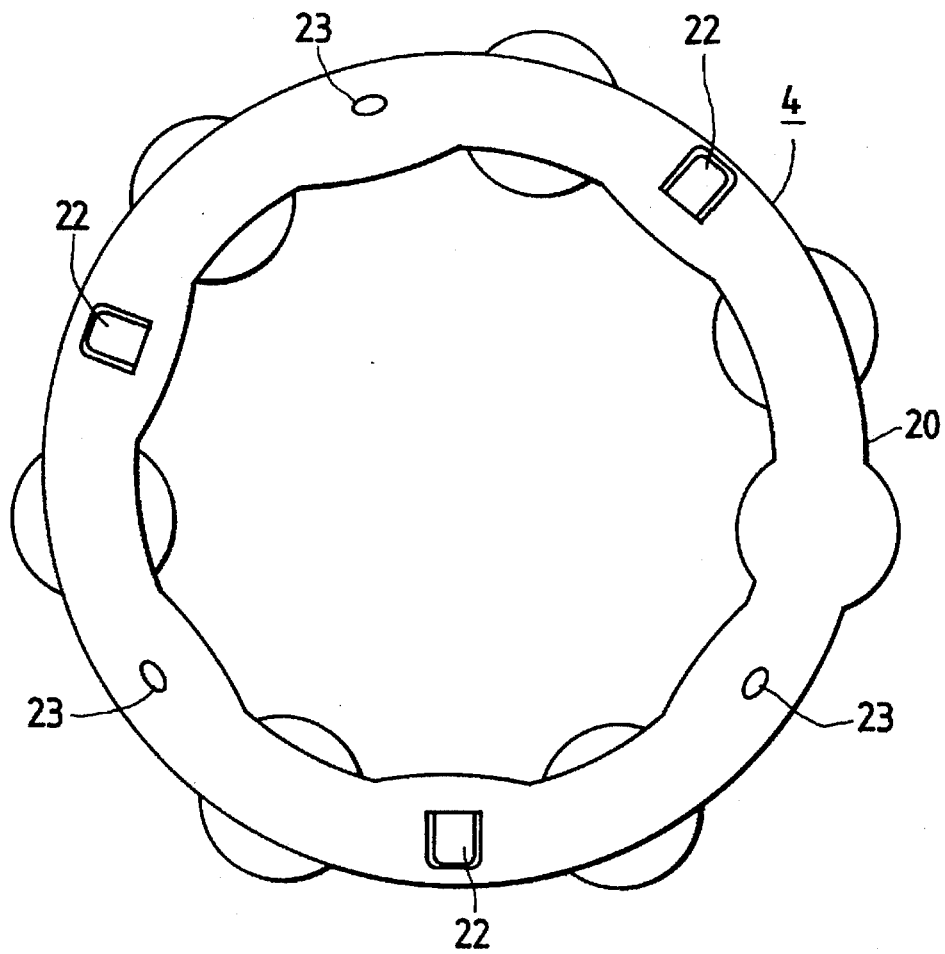
FIG. 7 is a bottom view showing the spacer.
Figure 8:
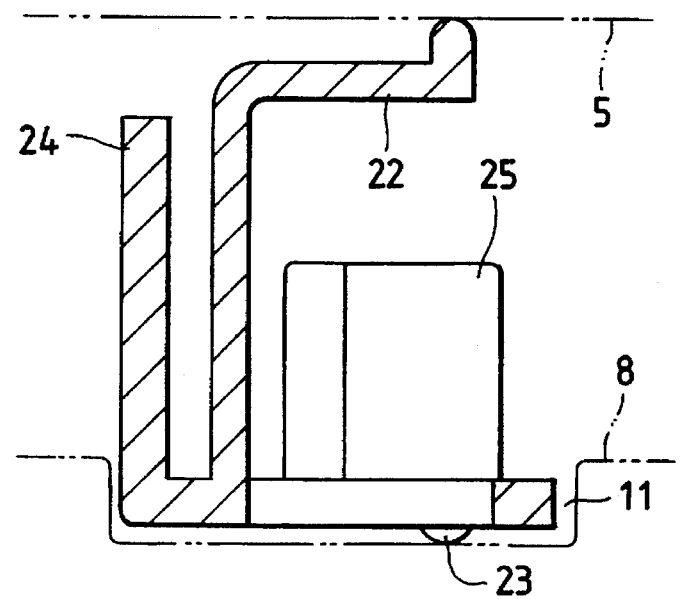
FIG. 8 is a cross sectional view taken along line 8—8 of FIG. 6.

FIG. 5 is a vertical cross sectional view showing a clock spring connector according to a second embodiment of the present invention. FIG. 6 is a plan view showing a spacer provided for the clock spring connector shown in FIG. 5. FIG. 7 is a bottom view showing the spacer. FIG. 8 is a cross sectional view taken along line 8—8 of FIG. 6. In the drawings, elements corresponding to those shown in FIGS. 1 to 4 are given the same reference numerals.

This embodiment differs from the first embodiment in that the means for elastically holding the spacer 4 in the accommodating space 15 comprises elastic arms 22 provided for the spacer 4 in place of the elastic arms 12 provided for the lower cover 8. The remaining elements are basically the same as those of the first embodiment.

That is, as shown in FIGS. 6 and 7, a plurality of cantilever-shape elastic arms 22 each having an L-shape cross sectional shape are integrally formed with the top surface of the rotary plate 20. Furthermore, a plurality of small projections 23 are formed integrally with the lower surface of the rotary plate 20. The elastic arms 22 and the small projections 23 are deflected in the circumferential direction of the rotary plate 20. In this embodiment, three elastic arms 22 and three small projections are alternately formed on the two vertical sides of the rotary plate 20. In addition, a plurality of pins 18 and one fixed cylinder 19 are stood erect on the top surface of the rotary plate 20, each pin 18 pivotally supporting the group of rollers 21 including the reversal rollers 21A. Furthermore, first ribs 24 are stood erect on the inner top end of the rotary plate 20 at positions except an area between the reversal roller 21A and the fixed cylinder 19. Each first rib 24 has, on the two ends thereof, second ribs 25 stood erect to face the outer surface of the roller 21 with small clearance maintained. The first ribs 24 are buckling preventing ribs for preventing outward expansion of the flexible cable 3 wound around the inner cylindrical portion 14 when the flexible cable 3 is rewound. The second ribs 25 are ribs for preventing erroneous insertion of the reversal portion 3a of the flexible cable 3 into a portion except the area between the reversal roller 21A and the fixed cylinder 19.

The spacer 4 is disposed in the accommodating space 15 in such a way that the rotary plate 20 is positioned at a lower position and the rotary plate 20 is engaged to the annular guide groove 11 formed on the top surface of the lower cover 8 so that the spacer 4 is rotatively guided in the radial direction of the accommodating space 15. Each small projection 23 is, at this time, placed on the top surface (the bottom surface of the guide groove 11) of the lower cover 8. As a result, a clearance is formed between the top surfaces of the fixed cylinder 19 and group of rollers 21 and the lower surface of the ceiling plate 5. However, the free end of each of the elastic arms 22 is elastically in contact with the lower surface of the ceiling plate 5. As a result, the spacer 4 is elastically held in the accommodating space 15 by each of the elastic arms 22. When the flexible cable 3 is wound or rewound, the spacer 4 receives force from the reversal portion 3a and is smoothly rotated along the guide groove 11. If the spacer 4 is vertically moved in the accommodating space 15 due to vibrations from the automobile, the movement is moderated by the deflection of each of the elastic arms 22. Therefore, the conflict between the spacer 4 and the lower cover 8 or the ceiling plate 5 is significantly prevented and thus generation of noise can be prevented. Moreover, each of the elastic arms 22 formed into the L-shape on the top surface of the rotary plate 20 is enabled to have a long length from the base portion to the free end thereof, thus reducing the sliding torque of the spacer 4, thereby smoothly rotating the spacer 4. The necessity for this embodiment to cause each of the elastic arms 22 to be elastically in contact with the ceiling plate 5 can be eliminated. If a clearance is formed between each of the elastic arms 22 and the ceiling plate 5, the vertical movement of the spacer 4 can be moderated by each of the elastic arms 22. Thus, the noise eliminating effect can be maintained.

Figure 9:
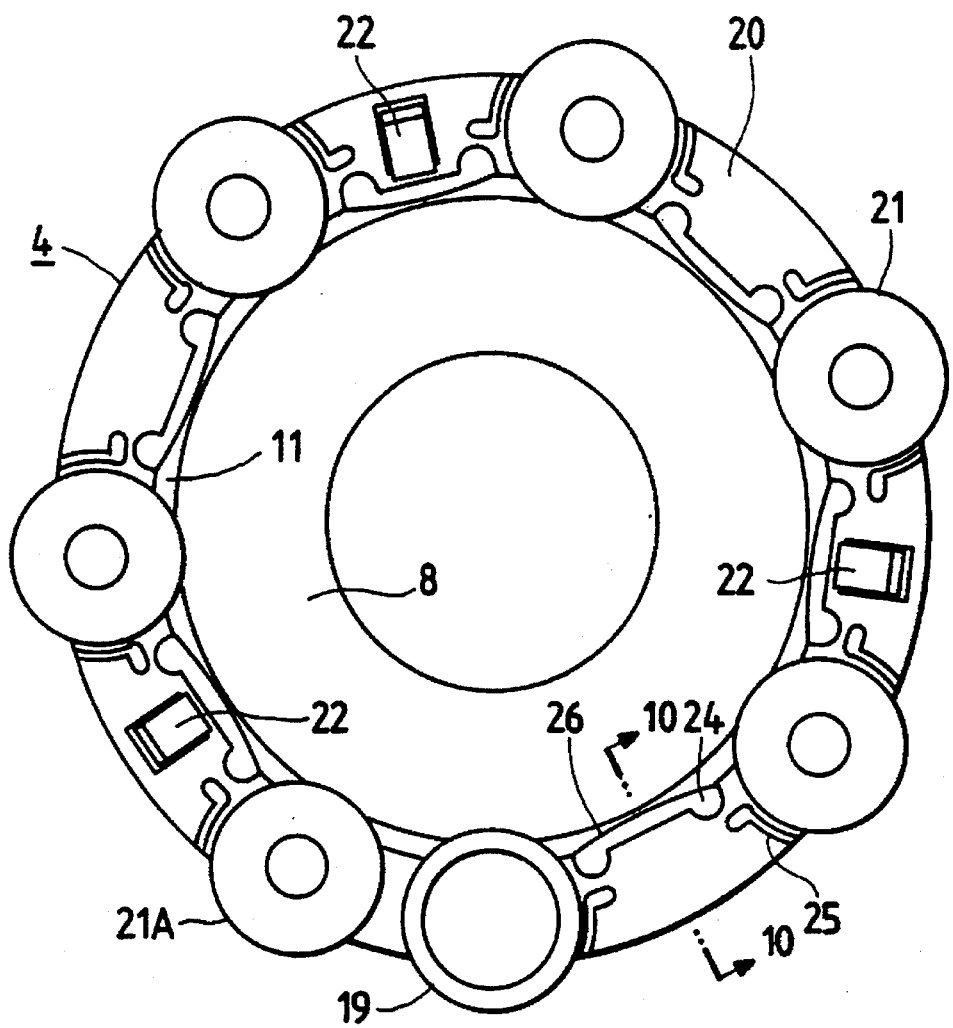
FIG. 9 is a plan view showing an essential portion of a clock spring connector according to a third embodiment of the present invention.
Figure 10:
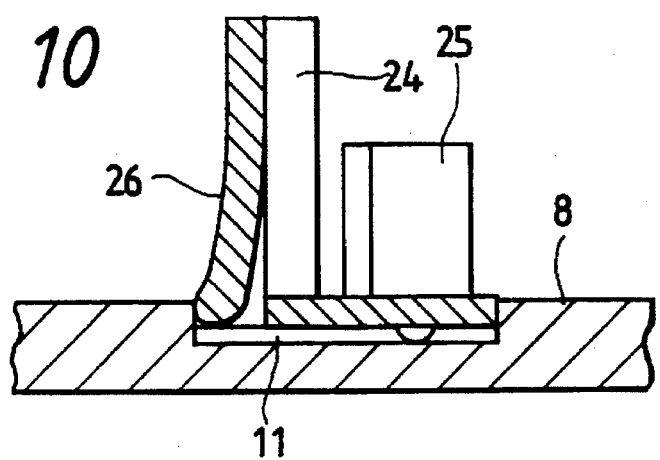
FIG. 10 is a cross sectional view taken along line 10—10 of FIG. 9.
Figure 11:
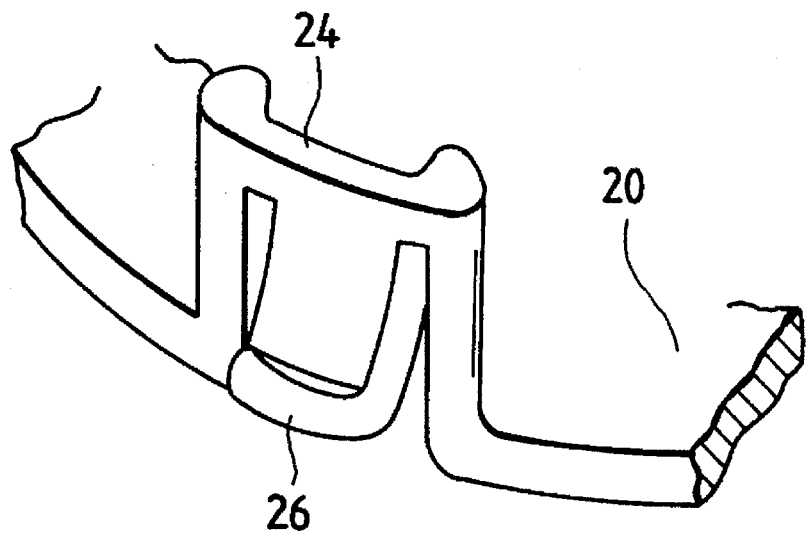
FIG. 11 is a perspective view showing an essential portion of FIG. 9.

FIG. 9 is a plan view showing an essential portion of a clock spring connector according to a third embodiment of the present invention. FIG. 10 is a cross sectional view taken along line 10—10 of FIG. 9. FIG. 11 is a perspective view showing an essential portion of the clock spring connector shown in FIG. 9. Elements corresponding to those shown in FIGS. 5 to 8 are given the same reference numerals. This embodiment differs from the second embodiment in that an elastic portion for elastically holding the spacer for in the radial direction with respect to the position of the first housing 1 is provided. The remaining structures are basically the same as the second embodiment.

That is, the rotary plate 20 of the spacer 4 has second elastic arms 26 each receiving elastic force acting in the radial direction and integrally formed into a cantilever shape. In this embodiment, the second elastic arms 26 in the form of cantilevers are integrally formed with a plurality of the first ribs 24. The free ends of the second elastic arms 26 are elastically in contact with the inner surface of the guide groove 11 formed in the lower cover 8. Therefore, the spacer 4 is elastically held in the vertical direction (in the axial direction of the steering shaft) in the accommodating space 15 by each of the elastic arms 22 while being elastically held in the radial direction (in a direction perpendicular to the axial direction of the steering shaft) of the accommodating space 15 by each of the second elastic arms 26.

In the aforesaid third embodiment of the present invention, the vertical movement of the spacer 4 in the accommodating space 15 is restricted by each of the elastic arms 22. As a result, the effect of preventing noise can be improved as compared with the second embodiment. Each of the second elastic arms 26 may be disposed at a position except those of the first ribs 24, for example, at the inner or outer ends of the rotary plate 20. In this case, a plurality of cantilever-type elastic arms formed at the inner or outer ends of the rotary plate 20 are elastically brought into contact with the inner or outer surface of the guide groove 11.

Figure 12:
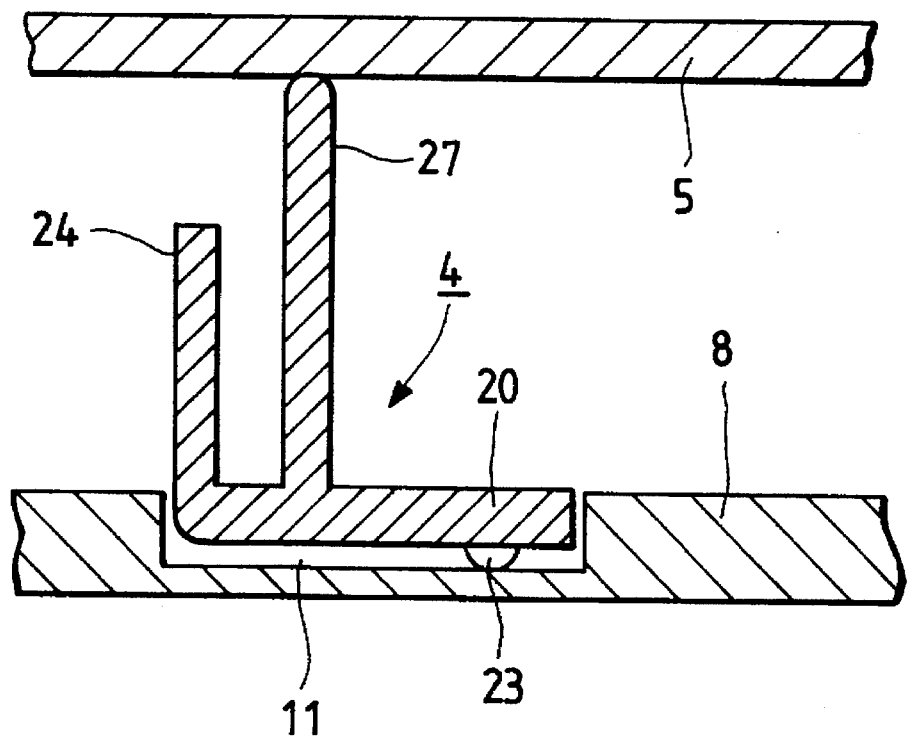
FIG. 12 is a cross sectional view showing an essential portion of a clock spring connector according to a fourth embodiment of the present invention.
Figure 13:
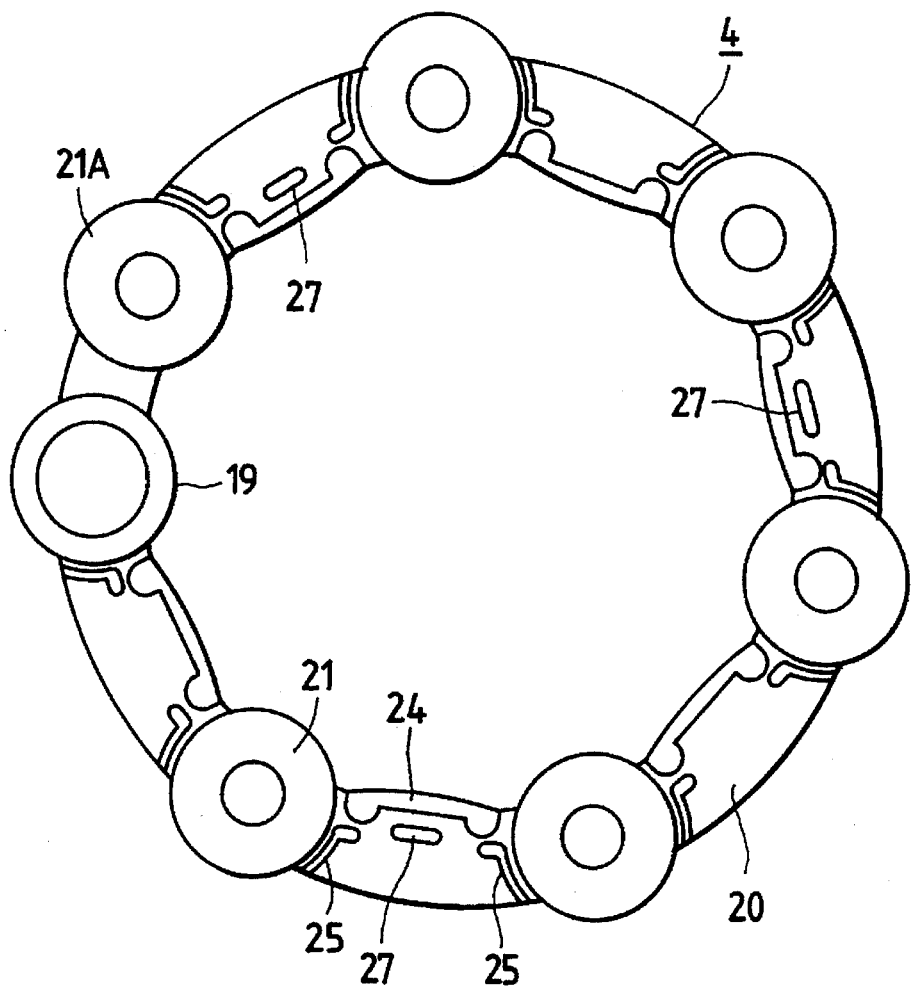
FIG. 13 is a plan view showing a spacer provided for the clock spring connector shown in FIG. 12.

FIG. 12 is a cross sectional view showing a clock spring connector according to a fourth embodiment of the present invention. FIG. 13 is a plan view of a spacer provided for the clock spring connector shown in FIG. 12. Elements corresponding to those shown in FIGS. 5 to 8 are given the same reference numerals. This embodiment differs from the second embodiment in that a plurality of projections are formed on the two vertical sides of the rotary plate 20 are used in place of the L-shape elastic arms 22 formed on the top surface of the rotary plate 20 to serve as the means for holding the spacer 4 in the accommodating space 15. The remaining structures are basically the same as those of the second embodiment. That is, a plurality of first projections 27 are stood erect on the top surface of the rotary plate 20. A plurality of small projections 23 (second projections) are integrally formed on the lower surface of the rotary plate 20. The first projections 27 and the small projections 23 are deflected in the circumferential direction of the rotary plate 20. In this embodiment, three first projections 27 and three small projections 23 are alternately formed on the two vertical sides of the rotary plate 20, the three small projections 23 being formed on the lower side of the rotary plate 20 at substantially the same angular intervals.

The thus constituted spacer 4 is disposed in the accommodating space 15 in such a way that the rotary plate 20 is positioned at a lower position. By engaging the rotary plate 20 to the annular guide groove 11 formed on the top surface of the lower cover 8, the spacer 4 is rotatively guided in the radial direction of the accommodating space 15. At this time, each small projection 23 is placed on the top surface (the bottom surface of the guide groove 11) of the lower cover 8, and the top end of each of the first projections 27 is brought into contact with the lower surface of the ceiling plate 5 or it faces the lower surface with a somewhat clearance maintained. Therefore, if vibrations from the automobile act on the spacer 4, the vertical movement of the spacer 4 in the accommodating space 15 is moderated due to deflection of the rotary plate 20 disposed between the first projection 27 and the small projection 23. Thus, contact between the spacer 4 with the lower cover 8 or the ceiling plate 5 is prevented considerably, and thereby preventing the generation of noise.

Figure 14:
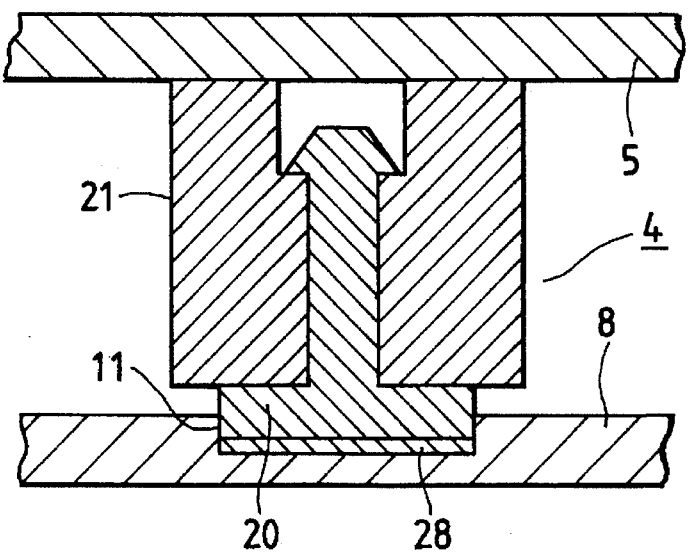
FIG. 14 is a cross sectional view showing a clock spring connector according to a fifth embodiment of the present invention.

FIG. 14 is a cross sectional view showing a clock spring connector according to a fifth embodiment of the present invention. FIG. 15 is an enlarged view showing an elastic sheet provided for the clock spring connector shown in FIG. 14. Elements corresponding to those shown in FIGS. 1 to 3 are given the same reference numerals. This embodiment differs from the first embodiment in that an elastic sheet 28 is applied to the lower cover 8 in place of the plurality of elastic arms 12. The remaining structures are the same as those of the first embodiment. That is, the elastic sheet 28 is applied to the top surface of the annular guide groove 11 formed in the lower cover 8. Furthermore, the lower surface of the rotary plate 20 of the spacer 4 is so placed on the elastic sheet 28 as to be capable of sliding on the elastic sheet 28. The elastic sheet 28, as shown in FIG. 15, comprises an elastic member 29 made of rubber or sponge and a slidable sheet 30 formed integrally with the elastic member 29 and made of PET or Teflon. In this embodiment, the slidable sheet 30 and the elastic member 29 positioned to oppose it are bonded to the lower cover 8 by an adhesive agent 31.

In the thus constituted fifth embodiment, when the flexible cable 3 is wound or rewound, the spacer 4 receives force from the reversal portion 3a and rotates in the accommodating space 15. At this time, the rotary plate 20 slides on the slidable sheet 30 on the elastic sheet 28, thereby causing the spacer 4 to slide smoothly along the guide groove 11. If the spacer 4 has been vertically moved in the accommodating space 15 due to vibrations from the automobile, the movement is absorbed due to the deflection of the elastic member 29 of the elastic sheet 28. Therefore, if conflict of the spacer 4 with the ceiling plate 5 takes place, impact with the lower cover 8 can be moderated and thus generation of noise can be halved. If the elastic sheet is applied to the ceiling plate, the elastic sheet serves as a cushion to moderate conflict of the spacer 4 with the ceiling plate and thereby noise can further be eliminated.

Although the fifth embodiment has the arrangement that the elastic sheet 28 is applied to the lower cover 8, a similar effect can be obtained if the elastic sheet 28 is applied to the lower surface of the rotary plate 20 in such a way that the slidable sheet 30 is positioned at a lower position. The necessity of applying the elastic sheet 28 to the lower cover 8 or the rotary plate 20 can be eliminated. For example, the elastic sheet 28 may be simply placed in the guide groove 11. In this case, the two vertical sides of the elastic sheet 28 are held between the slidable sheets 30 and the slidable sheets 30 are made to face the lower cover 8 and the rotary plate 20.

In each of the foregoing embodiments, the components of the spacer 4 are made of hard plastic, such as polypropylene, and the spacer 4 is elastically held in the accommodating space 15 by using the elastic portion, such as the elastic arms 12, 22 or the elastic sheet 28. However, the spacer 4 may be made of elastic material in place of providing the elastic portion. Specifically, the rotary plate 20 may be made of elastic material, such as polyurethane rubber, to use the elasticity of the material so as to moderate the vertical movement of the spacer 4.

Although each of the foregoing embodiment has the arrangement that the second housing 1 is made to serve as the fixed member and the first housing 2 is made to serve as the movable member, a converse structure may be employed in which the second housing 1 is made to be the movable member and the first housing 2 is made to be the fixed member.

In each of the foregoing embodiments, the ceiling surface and bottom surface of the accommodating space 15 is composed of the lower cover 8 adjacent to the second housing and the ceiling plate 5. However, the ceiling surface and bottom surface of the accommodating space 15 may be composed of members disposed adjacent to the first housing 2 or the same may be composed of a member disposed adjacent to the first housing or a member disposed adjacent to the second housing 1.

A sixth embodiment of the present invention will now be described with reference to the drawings.

Figure 17:
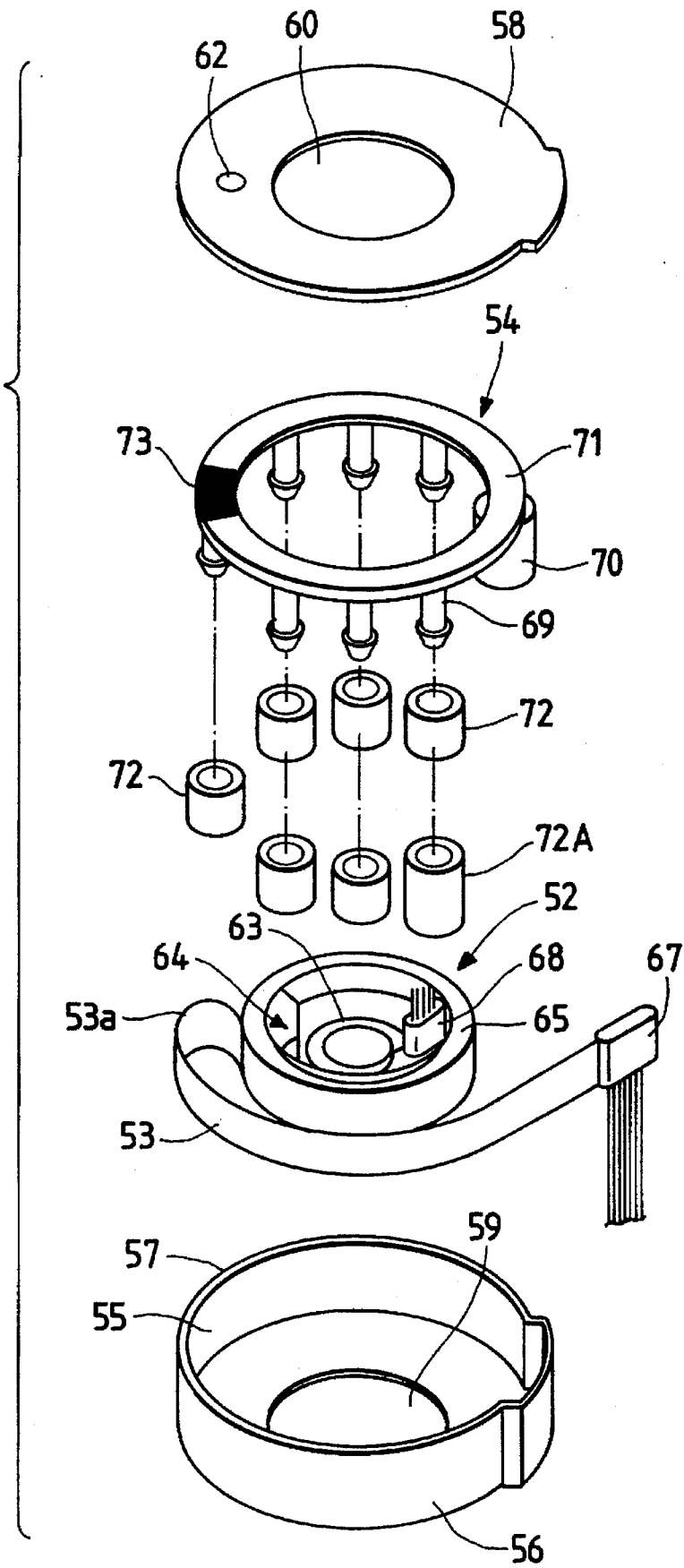
FIG. 17 is an exploded perspective view showing the clock spring connector according to the sixth embodiment.
Figure 18:
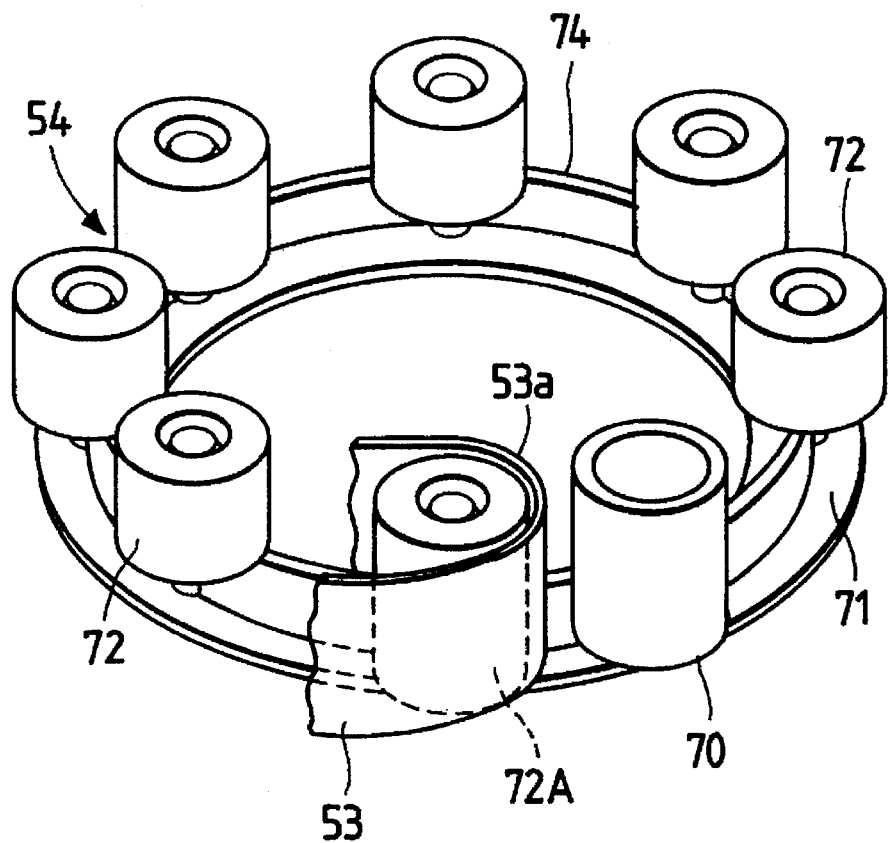
FIG. 18 is a perspective view showing a movable member provided for the clock spring connector shown in FIG. 16 when viewed from the reverse side.
Figure 19:
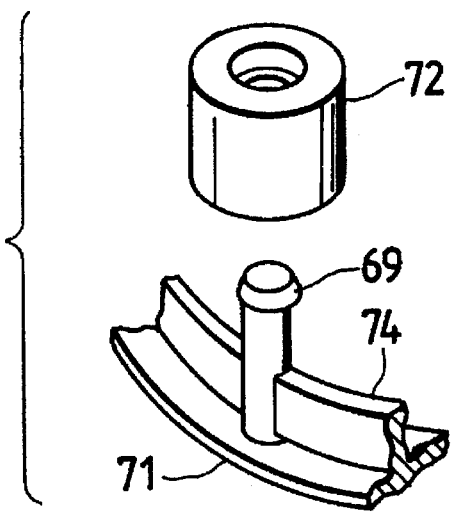
FIG. 19 is an exploded perspective view showing an essential portion of the movable member.

FIG. 16 is a vertical cross sectional view showing a clock spring connector according to the sixth embodiment of the present invention. FIG. 17 is an exploded perspective view showing the clock spring connector. FIG. 18 is a perspective view showing a movable member provided for the clock spring connector when viewed from the reverse side. FIG. 19 is an exploded perspective view showing an essential portion of the movable member. As shown in the drawings, the clock spring connector according to this embodiment comprises a first housing 51, a second housing 52 mounted rotatively with respect to the first housing 51, a flexible cable 53 accommodated between the two housings 51 and 52, and a movable member 54 rotatively disposed between the two housings 51 and 52.

The first housing 51 comprises a lower case 57 having a bottom plate 55 incorporating an outer cylinder portion 56 stood erect at the outer end thereof and an upper cover 58 integrally joined to the top end of the outer cylinder portion 56. The bottom plate 55 of the lower case 57 and the upper cover 58 respectively have center holes 59 and 60. Furthermore, the upper cover 58 has, in the lower surface thereof, an annular guide groove 61. In addition, a window opening 62, through which the inside can be observed, is formed on the locus of the guide groove 61.

The second housing 52 is formed into a cylinder having a shaft insertion port at the central portion thereof. When the two vertical ends of the outer portion of the second housing 52 are guided by the center holes 59 and 60 formed in the lower case 57 and the upper cover 58, the second housing 52 is connected rotatively with respect to the first housing 51. The second housing 52 has a ceiling surface in which a first mark 64 is formed such that the window opening 62 and the first mark 64 face (coincide with) each other whenever the second housing 52 rotates one time with respect to the first housing 51. A space 66 having an annular shape when viewed in a plan view is formed between the bottom plate 55, the outer cylinder portion 56 and the upper cover 58 adjacent to the first housing 51 and the inner cylinder portion 65 forming the outer surface adjacent to the second housing 52.

The flexible cable 53 comprises a so-called flat cable formed into the band-like shape including two parallel conductive wires laminated by a pair of insulating films. The flexible cable 53 according to this embodiment comprises a flat cable for five circuits including five conductive lines embedded therein. An end of the flexible cable 53 is connected to a first connector 67 secured to the outer cylinder portion 56 and is passed to the outside of the first housing 51 through the first connector 67. Another end of the flexible cable 53 is connected to a second connector 68 secured to the inner cylinder portion 65 and is passed to the outside of the second housing 52 through the second connector 68. The flexible cable 53 is accommodated in the space 66 in such a way that it is wound clockwise onto the inner wall of the outer cylinder portion 56 of the first connector 67, reversed in the form of a U-shape (hereinafter called a "reversal portion 53a"), and wound clockwise around the outer wall of the inner cylinder portion 65 to reach the second connector 68.

The movable member 54 comprises an annular rotary plate 71 having a plurality of pins 69 and one fixed cylinder 70 hung from the lower surface thereof, and a group of rollers 72 pivotally supported by each pin 69. The rotary plate 71 has a ceiling plate on which a second mark 73 serving as an indicator is formed. As shown in FIGS. 18 and 19, a rib 74 extending in the circumferential direction is formed at the central portion of the lower surface of the rotary plate 71 while being hung from the central portion. The rib 74 is continuous except at the position of the fixed cylinder 70 and those of the pin 69. A portion of the pins 69 that faces the fixed cylinder 70 receives long roller 72 (hereinafter called "reversal roller 72A") in a snapped manner, while residual pins 69 projecting over the rib 74 receive, in a snapped manner, short rollers 72 which are shorter than the reversal roller 72A. All rollers 72 including the reversal roller 72A and the lower surface of the fixed cylinder 70 are made to form substantially the same plane. The thus-constituted movable member 54 is disposed in the space 66 such that the movable member 54 is rotatively guided in the radial direction of the space 66 when the rotary plate 71 is engaged to the guide groove 61. The reversal portion 53a of the flexible cable 53 is passed through a space between the fixed cylinder 70 and the reversal roller 72A and is looped around the reversal roller 72A.

The thus-constituted clock spring connector is formed by assembling the elements in such a way that: initially the first and second connectors 67 and 68 are connected to the two ends of the flexible cable 53 cut to have a predetermined length, the second connector 68 being secured to the inside portion of the inner cylinder portion 65 of the second housing 52. Then, as shown in FIG. 17, the second housing 52 and the flexible cable 53 are brought into the lower case 57 in a state where a portion of the flexible cable 53 is reversed in the form of a U-shape. The first connector 67 is secured to the inside portion of the outer cylinder portion 56. On the other hand, all rollers 72 including the reversal roller 72A are pivotally supported by the pins 69 of the rotary plate 71 in the snapped manner. The movable member 54 is made to be upside down and disposed between the second housing 52 and the lower case 57. When the reversal portion 53a of the flexible cable 53 is correctly inserted between the reversal roller 72A of the movable member 54 and the fixed cylinder 70, the rotary plate 71 is horizontally accommodated in the lower case 57. If the reversal portion 53a is erroneously inserted into a portion except the space between the reversal roller 72A and the fixed cylinder 70, the top end of the reversal portion 53a in the widthwise direction is brought into contact with the lower surface of the rib 74, thus making the rotary plate 71 incline and considerably project over the outer cylinder portion 56 of the lower case 57. Therefore, an assembler is able to discriminate easily whether the reversal portion 53a of the flexible cable 53 has been correctly looped around the reversal roller 72A of the movable member 54 or not. If the movable member 54 has been correctly disposed between the second housing 52 and the lower case 57, the upper cover 58 is placed on the outer cylinder portion 56 of the lower case 57 and they are integrated by using an adequate means, such as welding or screws. Thus, the forming of the clock spring connector by assembling the elements is completed.

With reference to a case where the first housing 51 is used as the fixed member and the second housing 52 is used as the movable member, the operation of the clock spring connector according to this embodiment will now be described. In the foregoing case, the first housing 51 is secured to the steering column portion of the steering unit and the lead wire protruding from the lower case 57 is connected to an air bag drive circuit or a horn circuit or the like mounted on the car body portion. The second housing 52 is connected to a steering shaft or a steering wheel. The lead wire protruding from the second housing 52 is connected to an inflater for the air bag or a horn switch or the like mounted on the steering wheel portion. The operation of the steering wheel and that of the flexible cable 53 are the same as those according to the first embodiment.

The thus-constituted clock spring connector must be mounted on the steering unit in such a manner that the second housing 52 is able to rotate in both clockwise and counterclockwise directions by the same degree of rotation from the neutral position of the steering wheel. Accordingly, this embodiment is provided with an alignment mechanism. That is, in a neutral state in which the flexible cable 53 is wound around the outer cylinder portion 56 of the first housing 51 and the inner cylinder portion 65 of the second housing 52 by substantially the same quantity of winding, the second mark 73 formed on the rotary plate 71 is positioned immediately below the window opening 62 of the upper cover 58. Simultaneously, the first mark 64 formed on the second housing 52 and the window opening 62 face each other. Therefore, the second mark 73 can be observed through the window opening 62 to visually detect that the second housing 52 is positioned at the neutral position of the rotation. If the second housing 52 is clockwise or counterclockwise deflected from the neutral position of the rotation, the relative position between the rotary plate 71 which rotates to follow the reversal portion 53a of the flexible cable 53 and the first housing 51 serving as the fixed member is changed. Therefore, the second mark 73 cannot be observed through the window opening 62, thus enabling that the second housing 52 is not at the neutral position of the rotation to be visually detected. If the rotary plate 71 is rotated by one or more times clockwise or counterclockwise with respect to the neutral position, the window opening 62 and the second mark 73 align with each other though the second housing 52 is not at the neutral position. However, the difference in the quantity of rotation between the rotary plate 71 and the second housing 52 enables that the second housing 52 is at the neutral position of the rotation to be discriminated only when all of the window opening 62, the first mark 64 and the second mark 73 align with one another.

Since the clock spring connector according to the sixth embodiment has the arrangement that the flexible cable 53 is wound around the outer cylinder portion 56 and the inner cylinder portion 65 in the opposite directions through the reversal portion 53a, the required length for the flexible cable 53 can be shortened. As a result, the total cost and the size of the clock spring connector can be reduced. Furthermore, the arrangement is made that the movable member 54 is disposed between the position at which the flexible cable 53 is wound around the outer cylinder portion 56 and the position at which the same is wound around the inner cylinder portion 65 and that the group of the plural rollers 72 including the reversal roller 72A are pivoted by the movable member 54. Therefore, the radial directional expansion and buckling of the flexible cable 53 occurring at a position in a route, which reaches the reversal portion 53a when the flexible cable 53 is rewound, can be prevented by the group of the rollers 72. Therefore, the winding operation can be completed assuredly. Furthermore, the arrangement is made that the reversal portion 53a of the flexible cable 53 is looped around one of the rollers 72 (the reversal roller 72A) included in the group of the rollers 72 and the fixed cylinder 70 is disposed to face the reversal roller 72A through the reversal portion 53a. As a result, the ejection of the reversal portion 53a cannot be inhibited when the flexible cable 53 is rewound, thus enabling the rewinding operation to be performed assuredly. The second indicator mark 73 formed on the rotary plate 71 provided for the movable member 54 so as to be visually observed through the window opening 62 formed in the upper cover 58 enables alignment between the first housing 51 and the second housing 52 to be performed visually. Therefore, the alignment mechanism can be simplified and the size of the clock spring connector can easily be reduced. Furthermore, the rib 74 formed on the rotary plate 71 at positions except the position, through which the reversal portion 53a of the flexible cable 53 passes, enables easy discrimination to be made during the assembling process as to whether or not the reversal portion 53a has been correctly looped around the reversal roller 72A. Therefore, problems rising due to erroneous assembly of the rotary plate 71 can be prevented. For example, misalignment between the first housing 51 and the second housing 52 which occurs due to the position deflection between the reversal portion 53a and the second mark 73, or inhibition of the movement of the reversal portion 53a which occurs when the reversal portion 53a is brought to a position between the rollers 72, which rotate together, can be prevented. Since the rib 74 is continued at the top ends of the rollers 72 and the rib 74 and the rollers 72 mutually overlap in the widthwise direction of the flexible cable 53, no clearance is formed that causes the reversal portion 53a to be erroneously inserted into the rib 74 and the roller 72. Thus, an effect of preventing the erroneous assembly of the rotary plate 71 can further be improved.

Figure 20:
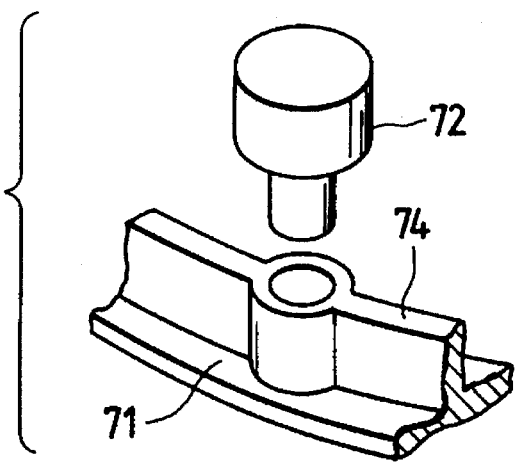
FIG. 20 is an exploded perspective view showing a modification of a means for pivotally supporting a roller.

Although the foregoing embodiment has the arrangement that the rotary plate 71 is guided by the upper cover 58 of the first housing 51, a converse structure may be employed in which the rotary plate 71 is guided by the bottom plate 55 of the first housing 51. As the means for pivotally supporting the group of the rollers 72 including the reversal roller 72a by the rotary plate 71, the illustrated structure, in which the rollers 72 are rotatively received by the pins 69 formed on the rotary plate 71 in the snapped manner, may be replaced by a structure shown in FIG. 20 and having an arrangement that the pin formed on the roller 72 is inserted into a shaft hole formed in the rotary plate 71.

Figure 21:
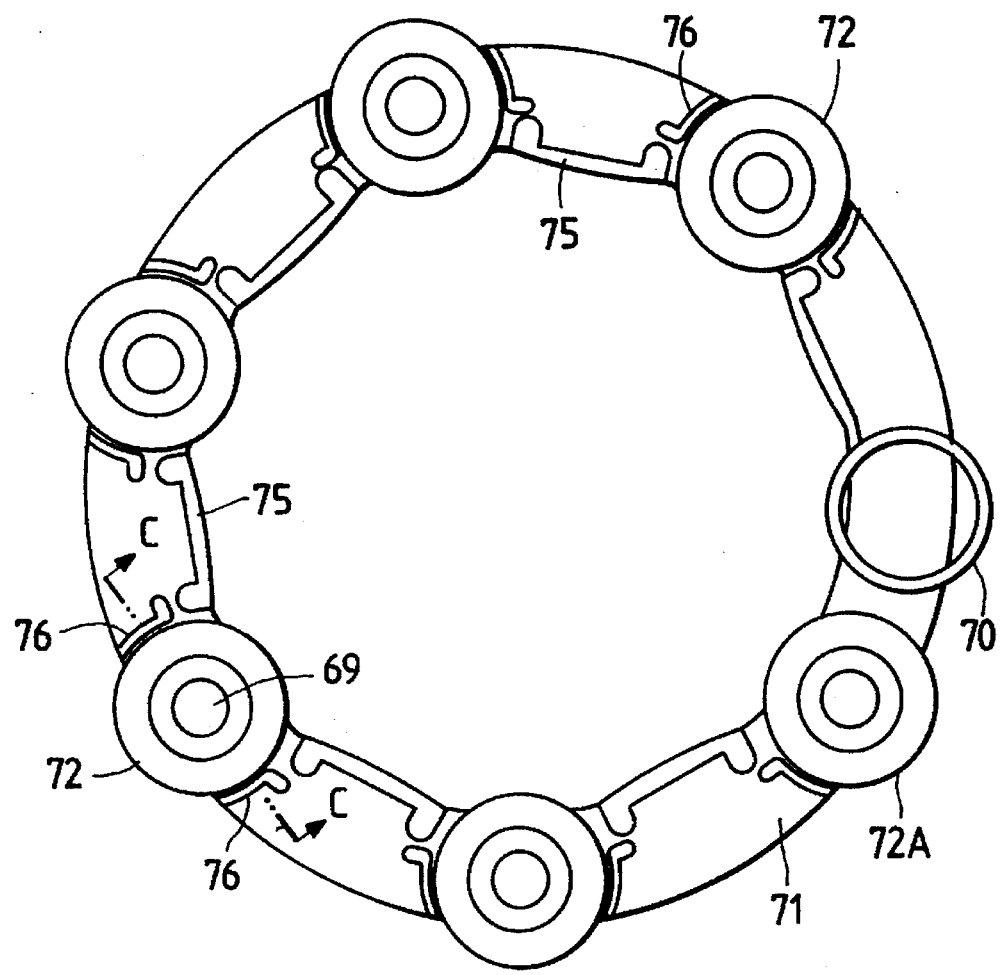
FIG. 21 is a plan view showing an essential portion of a clock spring connector according to a seventh embodiment of the present invention.
Figure 22:
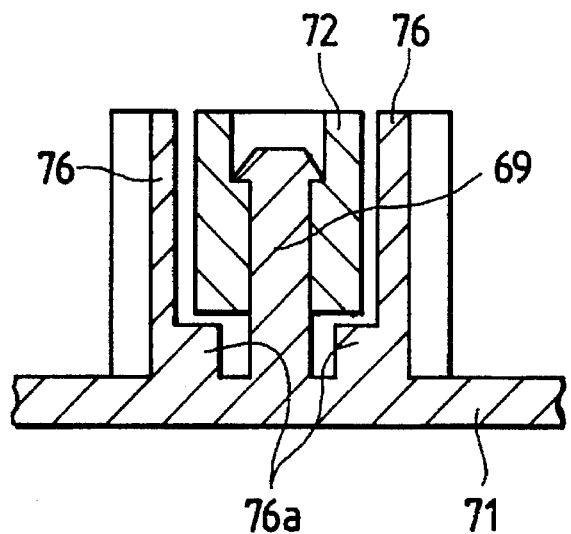
FIG. 22 is a cross sectional view taken along line 22—22 of FIG. 21.
Figure 23:
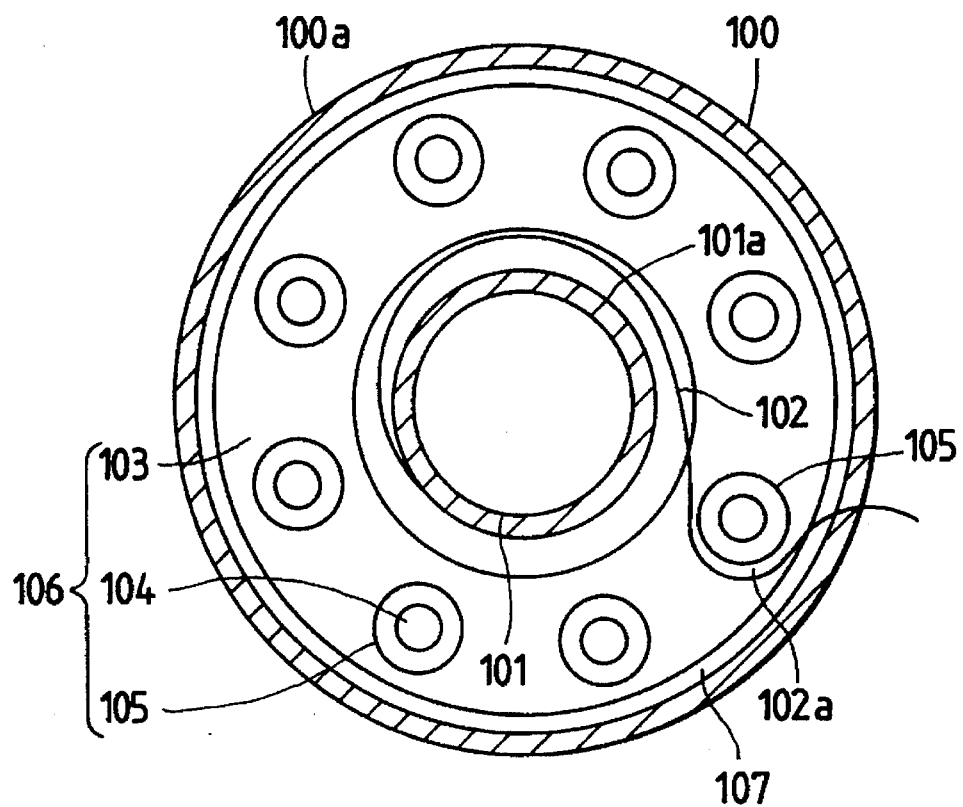
FIG. 23 is a plan view showing a conventional clock spring connector.

FIG. 21 is a plan view showing an essential portion of a clock spring connector according to a seventh embodiment of the present invention. FIG. 22 is a cross sectional view taken along line 22—22 of FIG. 21. Elements corresponding to those shown in FIGS. 16 to 19 are given the same reference numerals.

This embodiment differs from the sixth embodiment in that discontinuous first ribs 75 and second ribs 76 are formed in place of the continuous rib 74 formed on the rotary plate 71. The remaining structures are basically the same as the sixth embodiment. The first ribs 75 are disposed between each roller 72 except the space between the reversal roller 72A and the fixed cylinder 70, that is, they are disposed at spaces between the reversal roller 72A and adjacent rollers 72, between the fixed cylinder 70 and the adjacent rollers 72 and between residual rollers 72. A clearance for smoothing the rotations of the rollers 72 is formed between group of the rollers 72 including the reversal roller 72A and the first rib 75. The second ribs 75 are disposed adjacent to the two ends of each first rib 75, the second ribs 76 serving as auxiliary ribs for substantially reducing the foregoing clearance required to be formed between each roller 72 and the first rib 75. Furthermore, a projection 76a extending toward the pin 69 is formed in the base portion of each second rib 76 as shown in FIG. 22. The projections 76a and each roller 72 overlap each other in the direction of the rotary shaft for the second housing 52.

If the reversal portion 53a of the flexible cable 53 has been correctly inserted into the space between the reversal roller 72A of the movable member 54 and the fixed cylinder 70 during the process of assembling the components of the thus constituted clock spring connector, the rotary plate 71 is horizontally accommodated in the lower case 57. If the reversal portion 53a has been erroneously inserted into a space except the space between the reversal roller 72A and the fixed cylinder 70, the reversal portion 53a is brought into contact with the end of the first rib 75 or the second rib 76. If the reversal portion 53a is erroneously inserted into a clearance between the roller 72 and the first rib 75 or the second rib 76, the reversal portion 53a is brought into contact with the projection 76a of the second rib 76. In either case, the rotary plate 71 is inclined and considerably projected over the outer cylinder portion 56 of the lower case 57. Therefore, the assembler is able to easily discriminate whether or not the reversal portion 53a of the flexible cable 53 has been correctly looped to the reversal roller 72A in accordance with the state of the inclination of the rotary plate 71.

As described above, according to the present invention, the spacer can be smoothly rotated in the circumferential direction of the accommodating space due to the force from the reversal portion of the flexible cable when the flexible cable is wound or rewound. In addition, if external vibrations act in the axial direction of the steering shaft, the conflict between the spacer with the ceiling surface and bottom surface of the accommodating space can be prevented. Therefore, a clock spring connector with which generation of noise can be prevented can be provided.

Also according to the present invention, whether or not the reversal portion of the flexible cable 53 has been correctly looped to a specific roller can easily be discriminated during the assembling process. Therefore, a clock spring connector can be provided while restricting occurrence of defects.

Although the invention has been described in its preferred form with a certain degree of particularly, it is understood that the present disclosure of the preferred form can be changed in the details of construction and the combination and arrangement of parts may be resorted to without departing from the spirit and the scope of the invention as hereinafter claimed.

What is claimed is:

1. A clock spring connector comprising:

a first housing having an inner cylinder portion;

a second housing having an outer cylinder portion and mounted rotatably with respect to said first housing such that the first and second housings define an annular accommodating space;

a spacer disposed in said accommodating space; and a flexible cable wound around said inner cylinder portion and said outer cylinder portion in opposite directions and having a reversal portion which is passed through said spacer, said spacer being arranged to move in said accommodating space to follow said reversal portion;

wherein said spacer is provided with an elastic portion facing at least one of a ceiling surface and a bottom surface of said accommodating space, wherein said elastic portion is an elastic sheet applied to said spacer, and wherein a slidable sheet is applied to a surface of said elastic sheet.

2. A clock spring connector comprising:

a fixed member having a first cylinder portion;

a movable member having a second cylinder portion and mounted rotatably with respect to said fixed member;

a band-like flexible cable accommodated in a space formed between said first cylinder portion and said second cylinder portion;

an annular rotary plate disposed rotatably in said space; and a plurality of rollers pivotally supported by said rotary plate at predetermined intervals, said flexible cable being reversed around one of said rollers so as to be wound around said fixed member and said movable member in opposite directions, and two ends of said flexible cable being respectively fixed to said fixed member and said movable member, wherein ribs are formed between each adjacent pair of said rollers except between said one of said rollers and an adjacent roller, each rib having a width narrower than the diameter of said rollers, and wherein a portion of each of said ribs is located between said rotary plate and said rollers.

3. A clock spring connector according to claim 2, wherein a cylindrical member is secured to said rotary plate adjacent said one of said rollers, and said reversal portion is located between said one of said rollers and said cylindrical member.

4. A clock spring connector according to claim 2, wherein an indicator is disposed on said rotary plate for indicating a neutral position of rotation of said movable member.

5. A clock spring connector comprising:

a first housing having an inner cylinder portion;

a second housing having an outer cylinder portion and mounted rotatably with respect to said first housing such that the first and second housings define an annular accommodating space;

a spacer disposed in said accommodating space; and a flexible cable wound around said inner cylinder portion and said outer cylinder portion in opposite directions and having a reversal portion which is passed through said spacer, said spacer being arranged to move in said accommodating space to follow said reversal portion;

wherein an elastic portion is disposed on at least one of a ceiling surface and a bottom surface of said accommodating space, said elastic portion facing said spacer, wherein said elastic portion is an elastic sheet applied to said first housing or said second housing, and wherein a slidable sheet is applied to a surface of said elastic sheet.

6. A clock spring connector comprising:

a fixed member having a first cylinder portion;

a movable member having a second cylinder portion and mounted rotatably with respect to said fixed member;

a band-like flexible cable accommodated in a space formed between said first cylinder portion and said second cylinder portion;

an annular rotary plate disposed rotatably in said space, said annular rotary plate including a rib, the rib defining an opening; and a plurality of rollers connected to said rib such that said plurality of rollers are displaced from the annular rotary plate by a thickness of the rib, each of the plurality of rollers being rotatable about an axis which is perpendicular to the rotary plate and having a width measured along the axis;

wherein said flexible cable is reversed through said opening in said rib so as to be wound around said fixed member and said movable member in opposite directions, and two ends of said flexible cable being respectively fixed to said fixed member and said movable member; and wherein said flexible cable has a width which is greater than the width of the plurality of rollers.

7. A clock spring connector comprising:

a fixed member having a first cylinder portion;

a movable member having a second cylinder portion and mounted rotatably with respect to said fixed member;

a band-like flexible cable accommodated in a space formed between said first cylinder portion and said second cylinder portion;

a rotary spacer disposed rotatably in said space; and a plurality of rollers pivotally supported by said rotary spacer at predetermined intervals, said flexible cable being reversed around one of said rollers so as to be wound around said fixed member and said movable member in opposite directions, and two ends of said flexible cable being respectively fixed to said fixed member and said movable member, wherein a cylinder-like portion is fixed to said rotary spacer such that said flexible cable is reversed between said cylinder-like portion and said one of said rollers.

* * * * *